Jan. 31, 1928.
J. S. BOOTH
1,657,738
BRAKING DEVICE FOR VEHICLES
Filed May 17, 1926    2 Sheets-Sheet 2
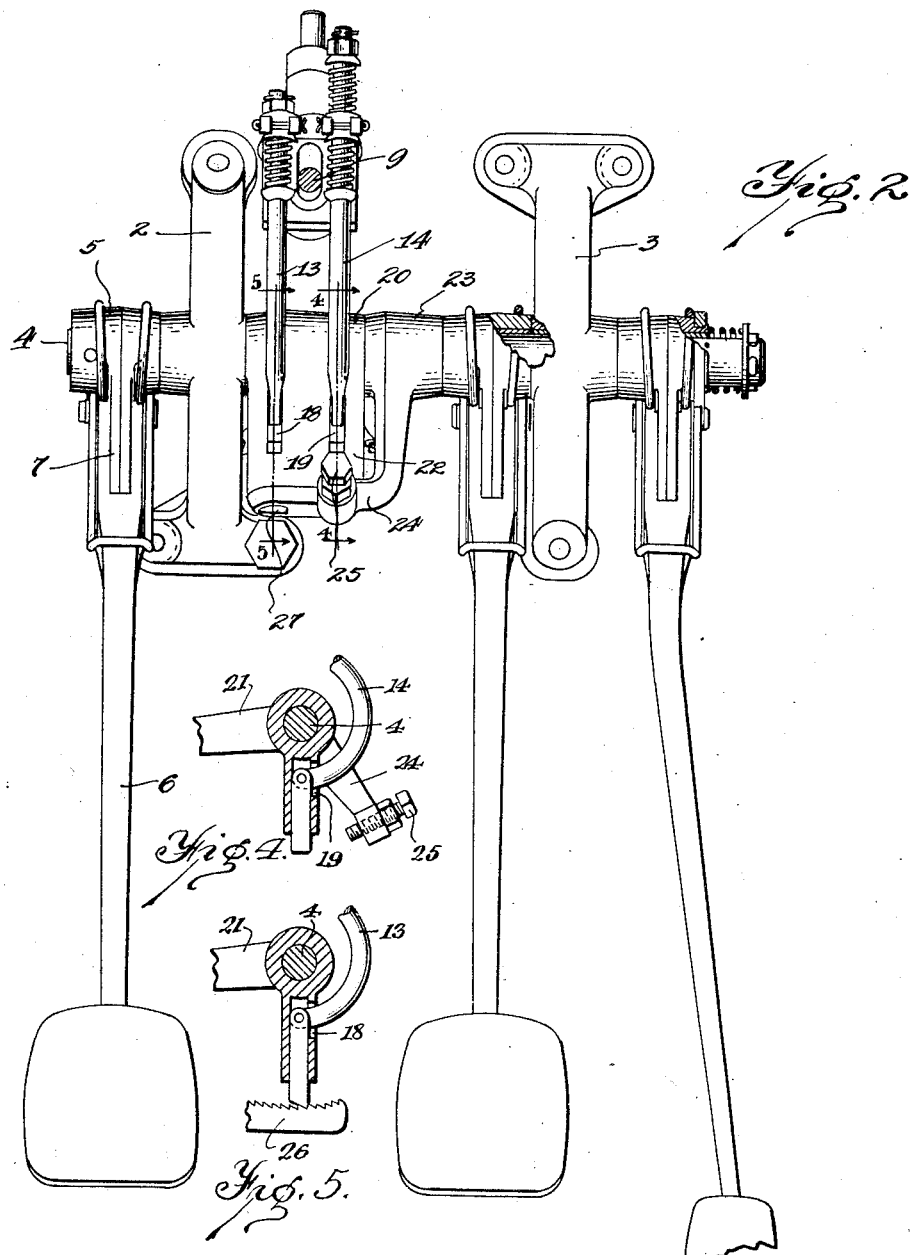
INVENTOR.
James Scripps Booth
BY
Stuart C. Barnes
ATTORNEY.

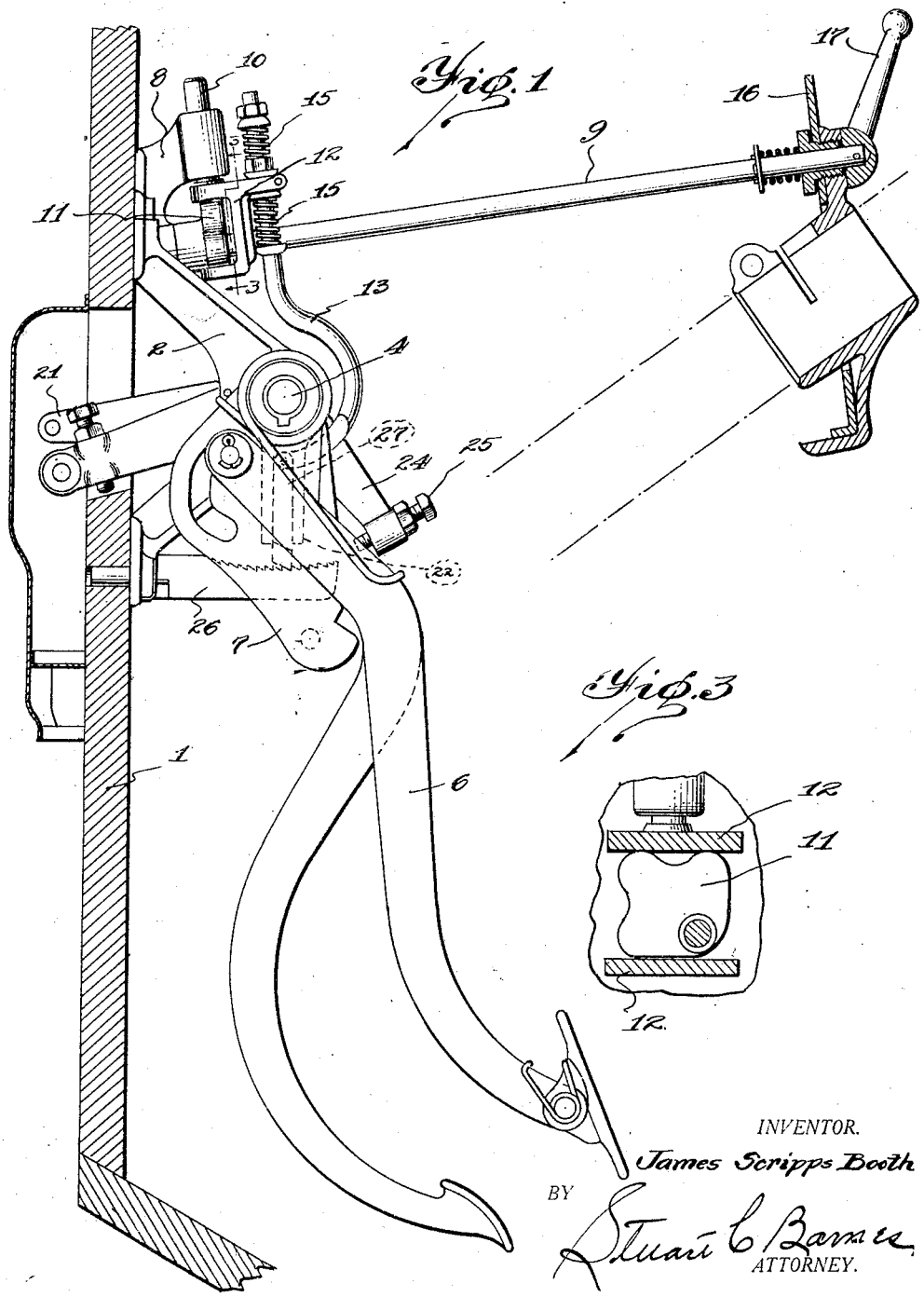

Patented Jan. 31, 1928.

1,657,738

UNITED STATES PATENT OFFICE.

JAMES SCRIPPS BOOTH, OF DETROIT, MICHIGAN.

BRAKING DEVICE FOR VEHICLES.

Application filed May 17, 1926. Serial No. 109,490.

This invention relates to a braking device for vehicles. It has to do with a novel and extremely simple device for effecting braking action by a foot pedal other than the ordinary brake pedal.

Heretofore, in the art of effecting a braking action in vehicles, and particularly in effecting an emergency braking action, it has been almost the universal custom to actuate the emergency brake rod or cable by some direct or indirect leverage which has been operated directly by the hand of the driver.

It is the object of the present invention to effect an emergency action by a pedal other than the brake pedal, and preferably the ordinary clutch pedal of the automobile. This braking action is easily effected by a small easily accessible operating member which is preferably located on the instrument board, and which is operable in one position to permit normal operation and use of the clutch pedal, and in another position to effect a positive actuation of the emergency brake upon the actuation of the clutch pedal and release of the clutch.

In the drawings:

Fig. 1 is a fragmentary vertical section taken through the driver's compartment of an automobile equipped with my novel emergency brake operating device.

Fig. 2 is a detail front elevation of the structure shown in Fig. 1, and showing the novel manner of connecting the cam operated rods to the pawls for connecting the clutch lever to the emergency brake operating lever.

Fig. 3 is a fragmentary detail view taken on the line 3—3 of Fig. 1.

Fig. 4 is a cross sectional view showing the ratcheting pawl and the manner of connecting the same.

Fig. 5 is a cross sectional view showing the brake actuating pawl and manner of connecting the same.

The dash of the car may be designated 1; secured to this dash is a pair of brackets 2 and 3, which rotatably support a shaft 4. A suitable hub 5 is keyed to the shaft 4, and is designed to be connected to a clutch 6 by means of an adjusting member 7. This adjusting member 7 forms no part of the present invention and it will be obvious that the clutch lever 6 may be, if desired, connected directly to the hub 5.

In the embodiment illustrated in the drawings, the shaft 4 is adapted to support the various hubs forming a part of the brake lever and accelerator lever. Secured to the dash 1, at a point above the shaft 4, is a guide bracket 8 which is designed to rotatably support one end of an operating shaft 9, and to slidably support a guide member 10. The lower end of this operating shaft 9 is provided with a cam member 11 which is enclosed by suitable cam follower 12. This cam follower 12 is provided with suitable arms or brackets which embrace pawl operating rods 13 and 14. The cam follower 12 is designed to resiliently actuate such rods 13 and 14 by means of coil springs 15, which are inter-positioned between the extensions of the cam follower and washer members secured to the rods 13 and 14. The upper end of the shaft 9 preferably extends through the instrument board 16 at a point adjacent the steering column, and is provided with a suitable operating lever 17, which may be easily reached by the driver.

The lower ends of the rods 13 and 14 are curved and extend around the shaft 4, and extend into suitable slots 18 and 19 of the hub 20, which is rotatably supported by the shaft 4. This hub 20 carries a lever 21 which projects through the dash, and which is adapted to be connected by a cable or suitable rods with the emergency brake device. The hub 20 is provided with an extension 22 adapted to normally extend downwardly and this hub is provided with suitable pawls which are slidable therein, and which are pinned at their upper ends to the lower ends of the rods 13 and 14.

Keyed to the shaft 4, and actuated by each movement of the clutch lever, is a hub 23 and an integral arm 24. This arm 24 is designed to swing beneath the downward extension 22 upon the normal operation of the clutch 6. The inner end of this arm 24 is provided with a suitable adjustable contacting screw 25. The movement of the lever 17 to its "on" position will move the cam 11 to effect lowering of the pawls which are pinned to the lower ends of the rods 13 and 14. These pawls may be of any suitable shape, and may slide within the extension 22 in any suitable manner. The pawl at the lower end of the rod 14, when lowered, is adapted to drop in the path of the contacting screw 25 and the pawl at the lower end of the rod 13 is adapted to be dropped upon the movement of the cam 11 into engagement with the teeth of a suitable ratchet 26, which may be secured to the dash 1. The pawl at the lower end of the rod 14 may be called the operating pawl, and the pawl at the lower end of the rod 13 may be designated the ratcheting pawl. This ratcheting pawl is shown in dotted lines in Fig. 1, and may be designated 27. It will be obvious that when the operating lever 17 is moved to lower the pawls that a subsequent operation of the clutch lever 6 will cause the arm 24 and the screw 25 to engage the operating pawl, and thus move the hub 20 and the lever 21 to effect positive operation of the emergency brake. At the same time the ratcheting pawl 27 will engage the teeth on the ratchet 26 to hold the emergency brake locked, or in operating position, until the pawls are raised by subsequent operation of the operating lever 17.

In operation the pawls 13 and 14, being resiliently carried by the cam follower 12, will be raised or lowered by corresponding movement of the operating lever 17. The actuating arm 24, being keyed to the shaft 4, will be operated in unison with the clutch lever 6, and such operating lever will swing freely beneath the extension 22, and will be inoperative to effect any braking action unless the pawls are lowered, when such operating lever and its adjustable screw 25 will be effective to contact with the lowered actuating pawl to raise the lever 21, and effect the braking action upon movement of the clutch lever 6.

It will be understood that suitable coil springs 15 may be disposed both above and below the cam follower extension 12, on both of the rods 13 and 14. In my preferred construction I limit the rod 13 to one coil spring which is disposed beneath the cam follower 12. Instead of the coil spring around the rod 13 and above the cam follower, I preferably provide a suitable nut or stop as shown, whereby when the handle 17 is actuated to "off" position the pawl 27, movable within the slot 18, will be positively raised. The purpose of this rigid connection above the cam follower is to prevent any sticking of the ratcheting pawl after the handle 17 has been moved, which might be the case if the rod 13 would be resiliently mounted on both sides of the cam follower. It will therefore be obvious that by this construction when the arm 17 has been moved to lower the pawls and the clutch lever moved forwardly to actuate the emergency brake, the lever 17 may be then moved to "off" position, whereby the ratcheting pawl will be positively raised, while the operating pawl may be still held in frictional contact with the clutch lever as it is moved back to gradually release the emergency brake lever.

I claim—

1. In automotive vehicles having a foot lever other than the brake lever for controlling the actuation of the vehicle, the combination of means for actuating the emergency brake, and means for connecting the said first-named means to said lever to effect actuation of the emergency brake by the operation of said lever.

2. In motor car construction, the combination of an emergency brake, a clutch lever, means for causing actuation of the emergency brake, and means for adjustably connecting said actuating means to said clutch lever to effect actuation of the brake by movement of the clutch lever.

3. In motor car construction, the combination of an emergency brake actuating means, a foot lever having a part movable relative to but normally inoperative upon said means, and manually adjustable means for temporarily connecting said actuating means and the relatively movable part of said foot lever to effect actuation of the emergency brake upon operation of said foot lever.

4. In motor car construction, the combination of a braking device and actuating means therefor, an arm movable in unison with the clutch lever, and means manually operable to move said brake actuating means in the path of movement of said arm to effect actuation of the brake by movement of the clutch lever.

5. In motor car construction, the combination of a braking device and actuating means therefor, a shaft having a clutch lever keyed thereto, a brake actuating arm keyed to said shaft and operable in unison with said clutch lever, and means manually operable by the operator to effect movement of said brake actuating means into the path of said operating arm to effect braking action by the movement of the clutch lever.

6. In motor car construction, the combination of a braking device, actuating means therefor including a lever keyed to the clutch shaft, a clutch lever secured to said shaft, means rotatably secured to said shaft and connected directly to the braking device, and means for connecting said last-named means with the arm keyed to the shaft for effecting braking of the car by movement of the clutch lever.

7. In motor car construction, the combination of a clutch lever and shaft for supporting the same, a member pivotally mounted on said shaft and containing a pawl adapted to be raised and lowered by means extending through the instrument board and operated by a lever mounted thereon, a braking device having actuating means connected to said pivoted member, and means movable in unison with said clutch lever and adapted to contact with said pawl when lowered to effect actuation of the braking device.

8. In motor car construction, the combination of a braking device and actuating means therefor, a clutch lever, means adapted to connect said clutch lever with said brake actuating means to effect actuation of the brake by movement of the clutch lever, and means for maintaining said braking action.

9. In motor car construction, the combination of a braking device and actuating means therefor, a clutch lever having a part connected thereto and movable relative to said actuating means, and means operable by the operator for controlling the movement of a plurality of means connected with said brake actuating means, one of said plurality of means being adapted to be moved in the path of movement of said clutch operated means to cause actuation of the brakes by movement of the clutch lever, and the other of said plurality of means being adapted to temporarily maintain braking action.

In testimony whereof I have affixed my signature.

JAMES SCRIPPS BOOTH.